United States Patent [19]

Grald et al.

[11] Patent Number: 4,901,918
[45] Date of Patent: Feb. 20, 1990

[54] ADAPTIVE ANTICIPATOR MECHANISM FOR LIMITING ROOM TEMPERATURE SWINGS

[75] Inventors: Eric W. Grald, Maple Plain; J. Ward MacArthur, Minneapolis, both of Minn.

[73] Assignee: Gas Research Institute, Chicago, Ill.

[21] Appl. No.: 315,850

[22] Filed: Feb. 27, 1989

[51] Int. Cl.$^4$ .............................................. G05D 15/00
[52] U.S. Cl. .................................... 236/178 D; 364/143
[58] Field of Search ............. 364/143, 557; 236/46 R, 236/1 R, 78 D; 165/12

[56] References Cited

U.S. PATENT DOCUMENTS

| | | | |
|---|---|---|---|
| 3,399,832 | 9/1968 | Wilson et al. | 236/91 |
| 4,210,823 | 7/1980 | Kabat et al. | 236/78 D |
| 4,254,906 | 3/1981 | Hayes | 236/78 D |
| 4,353,409 | 10/1982 | Saunders et al. | 165/2 |
| 4,373,663 | 2/1983 | Hammer | 236/78 D |
| 4,393,662 | 7/1983 | Dirth et al. | 165/12 X |
| 4,442,972 | 4/1984 | Sahay et al. | 236/46 R X |
| 4,460,123 | 7/1984 | Beverly | 236/46 R |
| 4,489,882 | 12/1984 | Rodgers | 236/78 D |
| 4,569,476 | 2/1986 | Watabe | 165/12 X |
| 4,638,942 | 1/1987 | Ballard et al. | 236/46 E X |
| 4,674,027 | 6/1987 | Beckey | 364/143 |
| 4,696,427 | 9/1987 | Pichot et al. | 236/1 E |
| 4,725,001 | 2/1988 | Carney et al. | 236/46 R X |
| 4,753,388 | 6/1988 | Rummage | 236/46.1 R |
| 4,759,498 | 7/1988 | Levine et al. | 236/46 R |

Primary Examiner—William E. Wayner
Attorney, Agent, or Firm—Haugen and Nikolai

[57] ABSTRACT

An adaptive cycle rate thermostat control. A thermostat including a switch and apparatus for heat anticipation operates responsively to an anticipator time constant. Apparatus for sensing room temperature provides an electronic signal proportional to the room temperature sensed. Apparatus for providing an acitivation signal to the switch responsive to the heat anticipation apparatus and sensed temperature cycles a variable-speed heat pump. Apparatus for modifying the anticipator time constant in response to room temperature swings provides the modified anticipator time constant to the heat anticipation means so as to keep room temperature swings within desirable limits while operating the heat pump more efficiently.

16 Claims, 1 Drawing Sheet

ADAPTIVE ANTICIPATOR MECHANISM FOR LIMITING ROOM TEMPERATURE SWINGS

BACKGROUND OF THE INVENTION

The invention is directed generally to a thermostat for measuring the temperature within a structure and controlling energization of the temperature modifying apparatus for the structure, and more particularly to a thermostat for use with any variable-capacity heating or cooling equipment including two-speed heat pumps, two-stage furnaces and other such equipment.

It is desirable to design thermostats for heating and/or cooling systems that control room temperature swings within the structure so that the occupants do not experience discomfort due to widely varying temperatures. The room temperature swing has been found to be a function of the heating/cooling capacity of the plant, the thermostat cycling rate, the response time or time constant of the plant, and the thermal load on the building. A room temperature swing of 2° F. is generally considered the upper limit for acceptable comfort. By combining these factors, rules of thumb have been established for appropriate cycle rates for various heating/cooling systems: e.g., 6 cycles per hour for forced warm air furnaces, 3 cycles per hour for heat pumps and air conditioners. The variable-capacity plants mentioned in the first paragraph are able to modulate their heating/cooling output from full-capacity down to perhaps 50% of that value. At lighter loads, therefore, they can cycle on and off at low capacity resulting in a smaller room temperature swing. The cycle rate of the thermostat controlling this type of plant could be reduced from the typical values listed about without sacrificing comfort.

Balanced against the need for keeping the room temperature swing within the structure within desirable limits is the operational efficiency of the heating plant. It is desirable to maintain the lowest cycle rate possible yet insure that room temperature swings do not become so excessive as to compromise comfort. U.S. Pat. No. 4,356,962 to Levine uses a search method in order to adaptively achieve a predetermined temperature increase during a heating cycle and a thermal overshoot period which occurs following deenergization of a furnace. Levine's apparatus senses the change in building temperature, adaptively modifies either or both of the on and off cycles of the furnace and the delays associated with the furnace blower, and increments or decrements the on and off times of the furnace by one unit each burn cycle. Levine suggests that a unit may in the range of about 30 seconds or one minute or the like. However, since an on- plus off-cycle may typically be as long as an hour, it is believed that Levine's system may significantly lag actual temperature changes within the structure. Such a lag could result in an inability to reduce undesirable room temperature swings under rapidly changing conditions, such as might be experienced during the morning hours in many areas.

The invention operates to control room temperature swings within a desirable band through adjusting the anticipator time constant of a thermostat having an anticipator control. By adaptively varying this thermostat parameter, closed-loop temperature control is maintained at all times. In other words, the time periods of the on- and off-cycles are not calculated prior to the cycle—on the contrary, the thermostat remains responsive to load disturbances (or setpoint changes) throughout the cycle and can, therefore, initiate or terminate heating/cooling plant operation exactly when needed. The principal of the invention is to maintain the lowest cycle rate possible yet continuously control temperature in response to a temperature set point to insure that room temperature swings do not become so excessive as to compromise comfort.

SUMMARY OF THE INVENTION

An adaptive cycle rate thermostat control is disclosed, including a thermostat having a switch and a means for heat anticipation which operates responsively to an anticipator time constant. A means for sensing room temperature provides data to the control. Means for sampling the temperature is connected to the output of the sensing means and means for calculating the room temperature swing based on sample data received from the sampling means provides input to a means for comparing the room temperature swing to a predetermined value so as to provide an error signal. Means for modifying the anticipator time constant responsive to the value of the error signal is connected to the heat anticipation means. Means for providing an activation signal to the switch operates responsively to the heat anticipation means.

It is one object of the invention to adaptively modify the anticipator time constant of a thermostat so that the resulting cycle rate yields a desired level of room temperature swing.

It is another object of the invention to provide an adaptive cycle rate thermostat which will increase heating/cooling equipment efficiency due to increased on-times at a given load.

It is yet another object of the invention to significantly decrease the number of times the motor and compressor (and other mechanical components) in a heating or air conditioning unit cycles on and off thereby reducing compressor and motor wear.

Other features, objects and advantages of the invention will become apparent to those skilled in the art through the detailed description of the preferred embodiment, claims and drawings herein wherein like numerals refer to like elements.

DESCRIPTION OF THE PREFERRED EMBODIMENT

Figure 1:
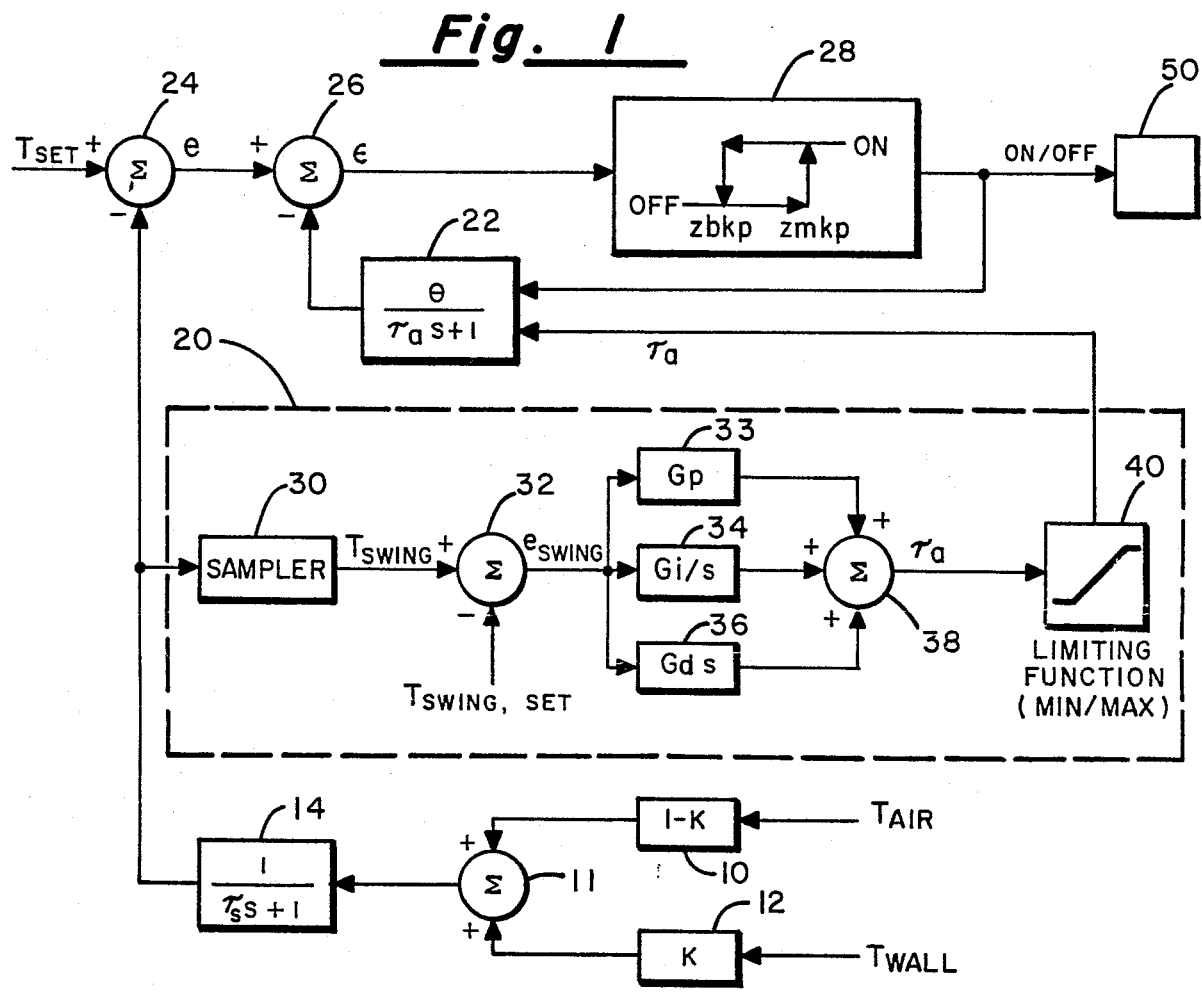
FIG. 1 shows a schematic block diagram illustrating the principals of the invention.

FIG. 1 shows schematically an illustrative block diagram of an adaptive cycle rate thermostat control employing the principals of the invention. The control comprises air coupling 10 and wall coupling 12, sensor 14, adaptive block 20 delineated by the broken line, heat anticipator 22, comparators 24 and 26 and switch 28. The adaptive block 20 further comprises sampler 30, comparator 32, gain blocks 33, 34 and 36, summing point 38 and limiter 40. Switch 28 is further connected to heat pump 50 in order to activate and deactivate the heat pump. It will be understood by those skilled in the art that heat pump 50 is representative of any number of devices capable of heating and/or cooling a structure including variable-speed heat pumps, air conditioning equipment, multi-speed heat pumps, furnaces and the like.

Couplings 10 and 12 apply wall coupling factors K and $1-K$ to the air temperature, $T_{air}$, and wall temperature, $T_{wall}$, and sum them at summing point 11.

A typical value for K is 0.5. The average temperature is then generated at the summing point and received by the temperature sensor 14. The sensor 14 has a first order response and operates on the average temperature according to the transfer function $1/(\tau_s S+1)$. $\tau_s$ is the sensor time constant and typically has a value of 20 minutes. Sensor 14 then outputs the sensed temperature, $T_{SENSED}$, to the sampler 30 and the comparator 24. In a typical thermostat operating with a heat anticipator, such as heat anticipator 22, the adaptive block 20 would be omitted from the control. Those skilled in the art will understand that the sensed temperature is compared at comparator 24 with the setpoint temperature $T_{SET}$, and the difference between the sensed temperature and the setpoint temperature is output from comparator 24 in the form of an error, e, into comparator 26. The error signal, e, is therein compared with the output of the heat anticipator 22 and the difference results in an activation signal, $\epsilon$, being applied to switch 28. As can be seen from FIG. 1, the switch 28 operates as a hysteresis switch between the limits zbkp and zmkp, where zbkp is the break point and zmkp is the make point. The difference between zmkp and zbkp is $\delta$, the switch differential. Typical values for zbkp and zmkp are $-1.5$ and 0, respectively (therefore, $\delta$ is 1.5). The feedback path between the output of the hysteresis switch 28 and the heat anticipator 22 serves to turn the anticipator on and off. The heat anticipator operates according to the transfer function $\theta/(\tau_a S+1)$, where $\tau_a$ is the anticipator time constant and $\theta$ is the heat of anticipation. The anticipator time constant has a nominal value of 7 minutes for a conventional 6 cycle per hour thermostat. The heat of anticipation is 4.5° F. in a typical thermostat. When controlling a heating appliance, the output of the anticipator will rise from zero to $\theta$ with time constant $\tau_a$ when switch 28 is closed. When switch 28 opens, the anticipator output will diminish to zero with the same time constant. When used to control a cooling appliance, the anticipator will be on when the switch is open and off when the switch is closed.

Those skilled in the art will recognize that, if the adaptive block 20 is ignored, FIG. 1 shows the elements of a typical thermostat. The operation of such a typical thermostat, as shown in FIG. 1 by omitting adaptive block 20, will be briefly described as applied to the control of a heating appliance. The typical values introduced above for the thermostat parameters will be used. For discussion purposes, the desired temperature setpoint is assumed to be 70° F. Consider the situation where the sensed temperature is greater than the setpoint, for example, 72° F., and the heating appliance has been off for some time. First, the sensed temperature is compared with the desired setpoint to form the error signal, e, which in this case is $-2°$ F. The output of the anticipator is then subtracted from e to form $\epsilon$. The output of the anticipator is initially zero, therefore $\epsilon$ is also $-2°$ F. Since zmkp is 0° F., the hysteresis switch 28 will remain in the off or open position. If the sensed temperature begins to decrease, the error signal e will begin to increase. If the sensed temperature becomes less than the setpoint, for example 69.9° F., the error signal, now 0.1° F., will be greater than zmkp and switch 28 will close. The closure of switch 28 turns the heating appliance on and simultaneously activates the heat anticipator 22. The output of the heat anticipator begins to increase from zero towards $\theta$. Even though heat is now being supplied to the room via the heating appliance, the sensed temperature may continue to fall slightly due to its inherently slow time response. For example, the sensed temperature may decrease to 69.8° F. Therefore, the error signal e is now 0.2° F. However, as the anticipator output increases and is subtracted from e, $\epsilon$ will decrease. If the value of $\epsilon$ becomes less than zbkp, which is $-1.5°$ F., the hysteresis switch 28 will open causing the heating appliance to shut off. This condition is satisfied, for the present example, if the sensed temperature is 69.8° F. and the anticipator output is 1.8° F., yielding an $\epsilon$ value of $-1.6°$ F. In practice, the sensed temperature will not vary much as the heating appliance cycles on and off, as noted above. Therefore, the heating appliance will be cycled on and off according to the magnitude of the slowly-changing error signal e (also called "droop") and the more rapid variation in the anticipator output, which is governed by the anticipator time constant, $\tau_a$. Note that the thermostat will continue to operate to continuously maintain the setpoint temperature regardless of whether or not the adaptive circuit changes the value of $\theta$ in the heat anticipator. However, when the adaptive circuit is added to the system, the benefits provided by the invention as noted above will be realized.

Focusing now on the adaptive circuit block 20, a sampler 30 is connected to the output of the sensor 14 to enable it to sample sensed temperatures. The sampler advantageously operates to sample temperatures over a complete operating cycle. The sampler then determines the maximum and minimum temperatures over one on/off cycle of the heating/cooling plant to compute the room temperature swing, $T_{swing}$. The sampler then outputs the value of $T_{swing}$ to comparator 32 where it is compared with a predetermined set point for room swing, $T_{swing,set}$. $T_{swing,set}$ may typically be set by the manufacturer of the controls to a predetermined value as, for example, 1.5° F. In alternative embodiments of the invention, $T_{swing,set}$ may be programmable by the user of the thermostat through the application of well-known programming mechanisms in a microprocessor-based thermostat. The difference between $T_{swing}$ and $T_{swing,set}$ is $e_{swing}$ which is then input into gain blocks 33, 34 and 36. The gain blocks operate according to the transfer functions Gp, Gi / s and Gd s, which represent proportional, integral and derivative gains, respectively. The use of such gain blocks in this manner is well known in the art and is often referred to as a "PID" control function. Gp, Gi and Gd are constant factors which are set in accordance with design choice for the particular system being controlled. The outputs of the PID blocks are summed at summing point 38 which outputs a value for $\tau_a$. Finally, a limiter 40 compares the value for $\tau_a$ against maximum and minimum limits. If it exceeds the maximum value allowed by the heat anticipator 22, it is set to the maximum value. If it is less than the minimum value allowed by the heat anticipator 22, $\tau_a$ is set to the minimum value. In this way, $\tau_a$ is adapted to operate on the anticipator 22 thereby contributing to the control of switch 28. Switch 28 is then connected to activate circuitry within the heat pump 50 either to turn the motor on or off depending on the results of the activation signal received from comparator 26.

As will be appreciated by those skilled in the art, the invention may be embodied in software or firmware for use with an electronic thermostat having a microprocessor or equivalent processing means. It is contemplated that the invention could also be embodied in analog circuitry for use with a thermostat having a heat anticipator mechanism. The sampler 30 may be any well known type of sampler and may advantageously be a digital sampler if used in connection with a microprocessor. Similarly, other components may be embodied in digital or analog form and adapted to be connected to each other accordingly.

Figure 2:
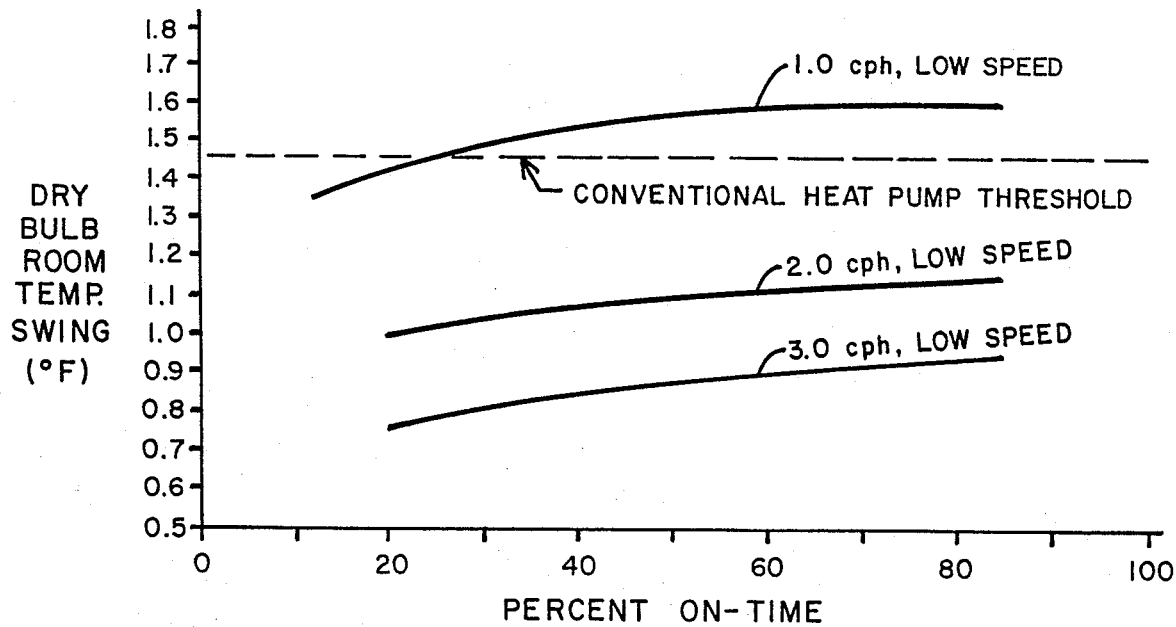
FIG. 2 shows graphically the room temperature swing for one, two and three cycle per hour thermostats operating with a variable-speed heat pump at minimum speed wherein the dashed line represents the room swing that would occur at 20 percent on-time with a conventional single-speed heat pump controlled by a typical three cycle per hour thermostat.

In operation, the adaptive cycle rate thermostat of the invention will maintain the lowest cycle rate such that the measured room temperature swing does not exceed a preset maximum. In one simulation of the invention, the maximum room swing was established based on conventional single-speed heat pump operations. FIG. 2 shows the room temperature swing for one, two and three cycle per hour thermostats operating with a variable-speed heat pump at minimum speed. The dashed line represents the room swing that would occur at 20 percent on time with a conventional single-speed heat pump controlled by a typical three cycle per hour thermostat. The cycle rate adapter illustrated in FIG. 1 will adjust the anticipator time constant such that the room temperature swing for the variable-speed heat pump will not exceed 1.5° F. As shown in FIG. 1, the anticipator time constant is limited by limiter 40. It is advantageous in applying the minimum and maximum limits to insure that cycle rates do not fall below 1 cycle per hour.

This invention has been described herein in considerable detail in order to comply with the Patent Statutes and to provide those skilled in the art with the information needed to apply the novel principals and to construct and use such specialized components as are required. However, it is to be understood that the invention can be carried out by specifically different equipment and devices and that various modifications, both as to the equipment details and operating procedures, can be accomplished without departing from the scope of the invention itself.

What is claimed is:

1. An adaptive cycle rate thermostat control comprising:
   (a) a thermostat including a switch and a means for heat anticipation which operates responsively to an anticipator time constant and a first error signal;
   (b) means for sensing room temperature and providing an electronic signal corresponding to the room temperature to the thermostat;
   (c) means for sampling the electronic signal from the sensing means, the sampling means being connected to the output of the sensing means;
   (d) means for calculating the room temperature swing based on discerning the maximum and minimum temperatures sampled in the sampling means;
   (e) means for comparing the calculated room temperature swing to a predetermined value so as to provide a second error signal;
   (f) means for modifying the anticipator time constant wherein the modifying means is responsive to the value of the second error signal; and
   (g) means for providing an activation signal to the switch responsive to the heat anticipation means.

2. The apparatus of claim 1 wherein the means for modifying the anticipator time constant comprises proportional, integral and derivative gain blocks which operate on the second error signal and whose outputs are processed through a summing point which, in turn, provides a modified value for the anticipator time constant.

3. The apparatus of claim 2 wherein the means for modifying the anticipator time constant further includes a means for limiting the minimum and maximum values of the anticipator time constant.

4. The apparatus of claim 1 wherein the first error signal is provided by a second means for comparing the temperature set point to the sensed room temperature.

5. The apparatus of claim 4 wherein the activation signal is generated by a third means for comparing which compares the first error signal with the output provided by the heat anticipation means.

6. The apparatus of claim 5 wherein the means for modifying the anticipator time constant comprises proportional, integral and derivative gain blocks which operate on the second error signal and are processed through a summing point which, in turn, provides a modified value for the anticipator time constant.

7. The apparatus of claim 6 wherein the means for modifying the anticipator time constant further includes a means for limiting the minimum and maximum values of the anticipator time constant.

8. An adaptive cycle rate thermostat control comprising:
   (a) a thermostat including a switch and means for heat anticipation which operates responsively to an anticipator time constant;
   (b) means for sensing room temperature and providing an electronic signal proportional to the room temperature sensed to the thermostat;
   (c) means for providing an activation signal to the switch responsive to the heat anticipation means and sensed temperature;
   (d) means for modifying the anticipator time constant in response to room temperature swings as calculated from the sensed room temperature and providing the modified anticipator time constant to the heat anticipation means.

9. The apparatus of claim 8 wherein the means for modifying the anticipator time constant comprises proportional, integral and derivative gain blocks which operate on an error signal corresponding to the difference between the sensed temperature room swing and a predetermined value and whose outputs are processed through a summing point which, in turn, provides a modified value for the anticipator time constant.

10. The apparatus of claim 9 wherein the means for modifying the anticipator time constant further includes a means for limiting the minimum and maximum values of the anticipator time constant.

11. The apparatus of claim 8 further including an error signal provided to the thermostat by a first means for comparing a predetermined temperature set point to the sensed room temperature.

12. The apparatus of claim 11 wherein the activation signal is generated by a second means for comparing which compares the error signal with the output provided by the heat anticipation means.

13. The apparatus of claim 12 wherein the means for modifying the anticipator time constant comprises proportional, integral and derivative gain blocks which operate on a second error signal corresponding to the difference between the sensed temperature room swing and a predetermined value and whose outputs are processed through a summing point which, in turn, provides a modified value for the anticipator time constant.

14. The apparatus of claim 13 wherein the means for modifying the anticipator time constant further includes a means for limiting the minimum and maximum values of the anticipator time constant.

15. An adaptive anticipator mechanism for limiting room temperature swings comprising:
   (a) means for sensing room temperature having an output providing a signal proportional to the sensed room temperature;
   (b) first means for comparing the sensed room temperature signal with a predetermined temperature set point signal and generating a first error signal representing the difference; wherein the first comparing means is connected to the output of the temperature sensing means;
   (c) means for sampling connected to the output of the temperature sensing means wherein the sampling means operates to calculate the sensed temperature room swing and has an output which provides a signal representing the sensed temperature room swing;
   (d) a second means for comparing which receives the sensed temperature room swing signal, compares it to a predetermined value and provides the resultant difference as a second error signal;
   (e) means for providing gain to the second error signal having an output signal representing the heat anticipation time constant;
   (f) means for receiving the heat anticipation time constant and applying maximum and minimum limitations to the heat anticipation time constant;
   (g) means for providing heat anticipation responsive to the limited heat anticipation time constant, wherein the heat anticipation means provides an anticipation signal;
   (h) third means for comparing the first error signal with the anticipation signal received from the heat anticipation means so as to generate an activation signal from the resultant difference; and
   (i) means for switching responsive to the activation signal.

16. The apparatus of claim 15 wherein the means for providing gain comprises proportional, integral and derivative gain blocks which operate on the second error signal and whose outputs are processed through a summing point which, in turn, provides a modified value representing heat anticipation time constant.

* * * * *